United States Patent
Shao (10) Patent No.: US 10,616,667 B1
(45) Date of Patent: Apr. 7, 2020

(54) GAS METER ENERGY-SAVING MOTIVATION METHOD BASED ON COMPOUND INTERNET OF THINGS (IOT) AND IOT SYSTEM

(71) Applicant: Chengdu Qinchuan Technology Development Co., Ltd., Chengdu (CN)

(72) Inventor: Zehua Shao, Chengdu (CN)

(73) Assignee: CHENGDU QINCHUAN TECHNOLOGY DEVELOPMENT CO., LTD., Chengdu (CN)

(*) Notice: Subject to any disclaimer, the term of this patent is extended or adjusted under 35 U.S.C. 154(b) by 0 days.

(21) Appl. No.: 16/362,609

(22) Filed: Mar. 23, 2019

(51) Int. Cl.
  *G06Q 10/00* (2012.01)
  *H04Q 9/00* (2006.01)
  *G06F 16/903* (2019.01)
  *H04L 29/08* (2006.01)

(52) U.S. Cl.
  CPC ............ *H04Q 9/00* (2013.01); *G06F 16/903* (2019.01); *H04L 67/12* (2013.01); *H04L 67/20* (2013.01); *H04Q 2209/826* (2013.01)

(58) Field of Classification Search
  CPC .. H04Q 9/00; H04Q 2209/826; G06F 16/903; H04L 67/12; H04L 67/20
  See application file for complete search history.

(56) References Cited

U.S. PATENT DOCUMENTS

| | | | | |
|---|---|---|---|---|
| 2010/0042453 A1* | 2/2010 | Scaramellino | ......... | G06Q 10/06 705/308 |
| 2011/0299541 A1* | 12/2011 | Diab | ...................... | G06Q 20/10 370/401 |
| 2012/0296799 A1* | 11/2012 | Playfair | ................. | G06Q 10/00 705/37 |
| 2014/0012552 A1* | 1/2014 | Zik | ........................ | G06Q 10/10 703/2 |

FOREIGN PATENT DOCUMENTS

CN          105978738 A          9/2016

* cited by examiner

*Primary Examiner* — Munear T Akki
(74) *Attorney, Agent, or Firm* — Getech Law LLC; Jun Ye (57) ABSTRACT

The present invention provides a gas meter energy-saving motivating method and Internet of Things (IoT) system based on a compound IoT, and relates to the field of the IoT. According to the gas meter energy-saving motivating method and IoT system based on the compound IoT, each of management sub-platforms searches for family population information associated with Identification (ID) information, calculates an average monthly gas usage amount according to monthly gas usage amounts and the family population information, sorts monthly per capita gas usage amounts in a preset area according to ID information in an ascending order, and sends a sorting result to a service platform; and then, the service platform sends reward information to user sub-platforms corresponding to top-ranked N monthly per capita gas usage amounts according to the sorting result. Therefore, users who save the gas can be rewarded; and thus, the gas meter energy-saving motivating method and IoT system may accelerate the users to save the gas, enhance the gas-saving consciousness of the users, and are energy-saving and environment-friendly.

10 Claims, 4 Drawing Sheets

GAS METER ENERGY-SAVING MOTIVATION METHOD BASED ON COMPOUND INTERNET OF THINGS (IOT) AND IOT SYSTEM

TECHNICAL FIELD

The present invention relates to the field of Internet of Things (IoT), and in particular to a gas meter energy-saving motivating method and IoT system based on a compound IoT.

BACKGROUND

Natural gas is one of safe gases, and it contains no carbon monoxide and is lighter than the air. Once it leaks, it will diffuse upwards immediately and will not accumulate to form explosive gas. Its safety is relatively higher than that of other gases. The use of natural gas as energy can reduce the use of coal and oil, thus significantly improving environmental pollution; natural gas, as a clean energy, can reduce nearly 100% of sulfur dioxide and dust emission, 60% of carbon dioxide emissions and 50% of nitrogen oxides emissions, and contribute to reducing acid rain formation, alleviating the greenhouse effects of the earth, so as to fundamentally improve environmental quality. With the development of society, the use of natural gas needs to be saved because of the increasing number of people who use natural gas and the fact that natural gas is a non-renewable resource. In the prior art, the main way to save natural gas is to regionally stop the supply of gas at cities or residence communities, and there is not yet a mature technical limitation or prompt to households over-consuming gas of the energy-saving needs.

SUMMARY

In view of this, an objective of the present invention is to provide a gas meter energy-saving motivating method and IoT system based on a compound IoT to improve the above-mentioned problem.

According to a first aspect, the present invention provides a gas meter energy-saving motivating method based on a compound IoT, which is applied to a gas meter energy-saving motivating IoT system based on the compound IoT; the gas meter energy-saving motivating IoT system based on the compound IoT includes a plurality of user sub-platforms, a service platform, a plurality of management sub-platforms, a plurality of sensor network sub-platforms and a plurality of object sub-platforms; each of the object sub-platforms includes a gas meter; and the gas meter energy-saving motivating method based on the compound IoT includes:

periodically sending, by each of the gas meters, a monthly gas usage amount and Identification (ID) information to a corresponding management sub-platform via a corresponding sensor network sub-platform;

searching for, by each of the management sub-platforms, family population information associated with ID information, and calculating an average monthly gas usage amount according to monthly gas usage amounts and the family population information;

sorting, by each of the management sub-platforms, monthly per capita gas usage amounts in a preset area according to ID information in an ascending order, and sending a sorting result to the service platform; and sending, by the service platform, reward information to user sub-platforms corresponding to top-ranked N monthly per capita gas usage amounts according to the sorting result.

According to a second aspect, the present invention further provides a gas meter energy-saving motivating IoT system based on a compound IoT; the gas meter energy-saving motivating IoT system based on the compound IoT includes a plurality of user sub-platforms, a service platform, a plurality of management sub-platforms, a plurality of sensor network sub-platforms and a plurality of object sub-platforms; and each of the object sub-platforms includes a gas meter;

each of the gas meters is configured to periodically send a monthly gas usage amount and Identification (ID) information to a corresponding management sub-platform via a corresponding sensor network sub-platform;

each of the management sub-platforms is configured to search for family population information associated with ID information, and calculate an average monthly gas usage amount according to monthly gas usage amounts and the family population information;

each of the management sub-platforms is configured to sort monthly per capita gas usage amounts in a preset area according to ID information in an ascending order, and send a sorting result to the service platform; and the service platform is configured to send reward information to user sub-platforms corresponding to top-ranked N monthly per capita gas usage amounts according to the sorting result.

Compared with the prior art, according to the gas meter energy-saving motivating method and IoT system based on the compound IoT provided by the present invention, each of the management sub-platforms searches for the family population information associated with the ID information, calculates the average monthly gas usage amount according to the monthly gas usage amounts and the family population information, sorts the monthly per capita gas usage amounts in the preset area according to the ID information in an ascending order, and sends the sorting result to the service platform; and then, the service platform sends the reward information to the user sub-platforms corresponding to the top-ranked N monthly per capita gas usage amounts according to the sorting result. Therefore, users who save the gas can be rewarded; and thus, the gas meter energy-saving motivating method and IoT system may accelerate the users to save the gas, enhance the gas-saving consciousness of the users, and are energy-saving and environment-friendly.

To make the above objectives, characteristics and advantages of the present invention more apparent and understandable, preferred embodiments are set forth hereinafter and are described below in detail in combination with accompanying drawings.

BRIEF DESCRIPTION OF DRAWINGS

To make the objectives, technical solutions and advantages of the embodiments of the present invention clearer, a clear and complete description of the technical solutions in the present invention will be given below in combination with the accompanying drawings in the embodiments of the present invention. Apparently, the embodiments described below are a part, but not all, of the embodiments of the present invention. Generally, a component, described and illustrated in the accompanying drawings, in the embodiments of the present invention may be disposed and designed in various different configurations. Therefore, the following detailed description concerning the embodiments of the present invention and provided in the accompanying drawings is not intended to limit a claimed scope of the present invention, but merely represents selected embodiments of the present invention. All of the other embodiments, obtained by a person of ordinary skill in the art based on the embodiments of the present invention without any inventive efforts, fall into the protection scope of the present invention.

Numerals in the drawings: 100—IoT system; 200—sensor network sub-platform; 300—management sub-platform; 400—service platform; 500—user sub-platform.

DESCRIPTION OF EMBODIMENTS

Figure 1:
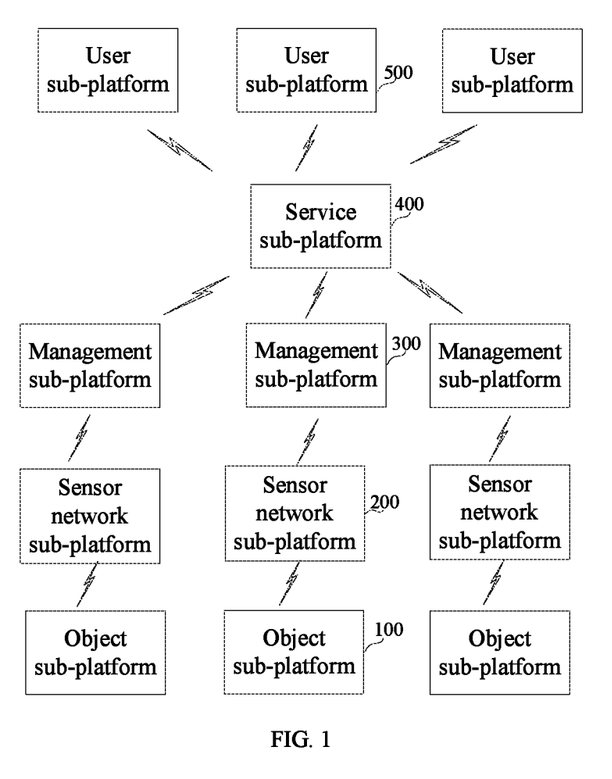
FIG. 1 illustrates an interactive schematic diagram of a gas meter energy-saving motivating IoT system based on a compound IoT provided by an embodiment of the present invention.
Figure 2:
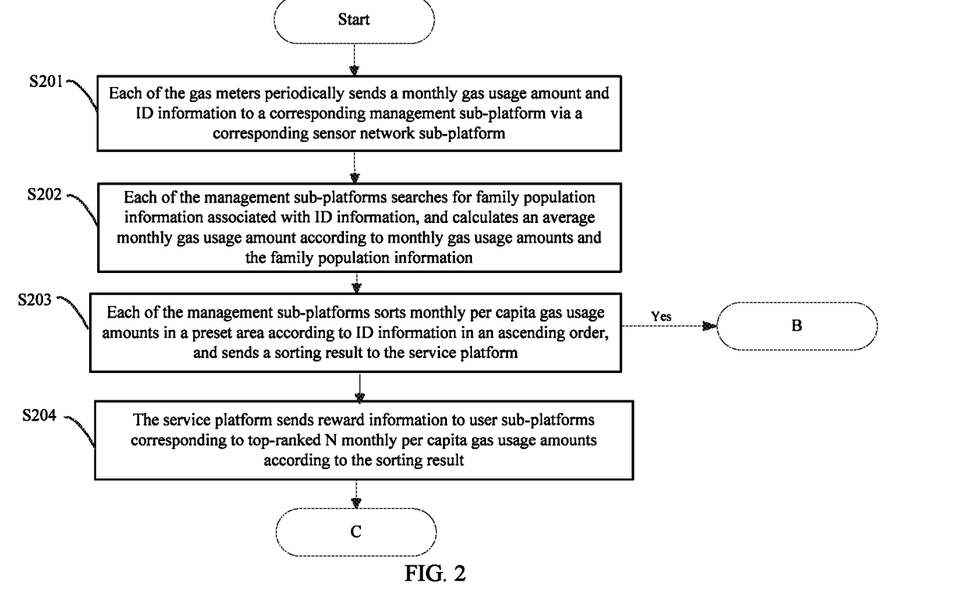
FIG. 2, FIG. 3 and FIG. 4 respectively illustrate a flowchart of a gas meter energy-saving motivating IoT system based on a compound IoT provided by an embodiment of the present invention.

Referring to FIG. 1, a gas meter energy-saving motivating method based on a compound IoT provided by an embodiment of the present invention is applied to a gas meter energy-saving motivating IoT system based on the compound IoT. The gas meter energy-saving motivating IoT system based on the compound IoT includes a plurality of user sub-platforms 500, a service platform 400, a plurality of management sub-platforms 300, a plurality of sensor network sub-platforms 200 and a plurality of object sub-platforms 100. Herein, any one of the plurality of object sub-platforms 100 may be communicatively connected with the management sub-platforms 300 via one or more of the sensor network sub-platforms 200 to send data of the object sub-platforms 100 to the management sub-platforms 300, or receive signals sent by the management sub-platforms 300. The management sub-platforms 300 are communicatively connected with the service platform 400. In this embodiment, the service platform 400 may include at least one of a gas company service platform 400, a government service platform 400 or a social operator service platform 400. The service platform 400 is communicatively connected with the user sub-platforms 500, and is configured to receive information sent by the user sub-platforms 500 and forward the information to the management sub-platforms 300, and push information sent by the management sub-platforms 300 to the user sub-platforms 500. The management sub-platforms 300 and the service platform 400 each may be a server. Each of the object sub-platforms 100 includes a gas meter. As shown in FIG. 2, the gas meter energy-saving motivating method based on the compound IoT includes the following steps:

Step S201: each of the gas meters periodically sends a monthly gas usage amount and ID information to a corresponding management sub-platform 300 via a corresponding sensor network sub-platform 200.

In this embodiment, the plurality of sensor network sub-platforms 200 may be a plurality of different gateways, and each object sub-platform 100 may send information to a management sub-platform 300 via one or more gateways. The management sub-platforms 300 communicate with the gas meters via the sensor network sub-platforms 200 to receive operation state information in real time. The periodically sending may send once at the end of every month.

Step S202: each of the management sub-platforms 300 searches for family population information associated with ID information, and calculates an average monthly gas usage amount according to monthly gas usage amounts and the family population information.

The gas usage amount of each house is closely associated with the number of family members, so the family population information may be more or less taken as a reference basis for judging whether the gas is used excessively or not.

Step S203: each of the management sub-platforms 300 sorts monthly per capita gas usage amounts in a preset area according to ID information in an ascending order, and sends a sorting result to the service platform 400.

Step S204: the service platform 400 sends reward information to user sub-platforms 500 corresponding to top-ranked N monthly per capita gas usage amounts according to the sorting result.

The users corresponding to the top-ranked N monthly per capita gas usage amounts are N users who save gas the most in the preset area. In this embodiment, each of the user sub-platforms 500 may be a universal electronic device, such as a Personal Computer (PC), a smartphone, a tablet computer, a Personal Digital Assistant (PDA), and a Mobile Internet Device (MID). The users may receive the reward information at the user sub-platforms 500. The reward information may be a gas purchase coupon, a gas purchase discount coupon or a red packet, which is not limited thereto.

Figure 3:
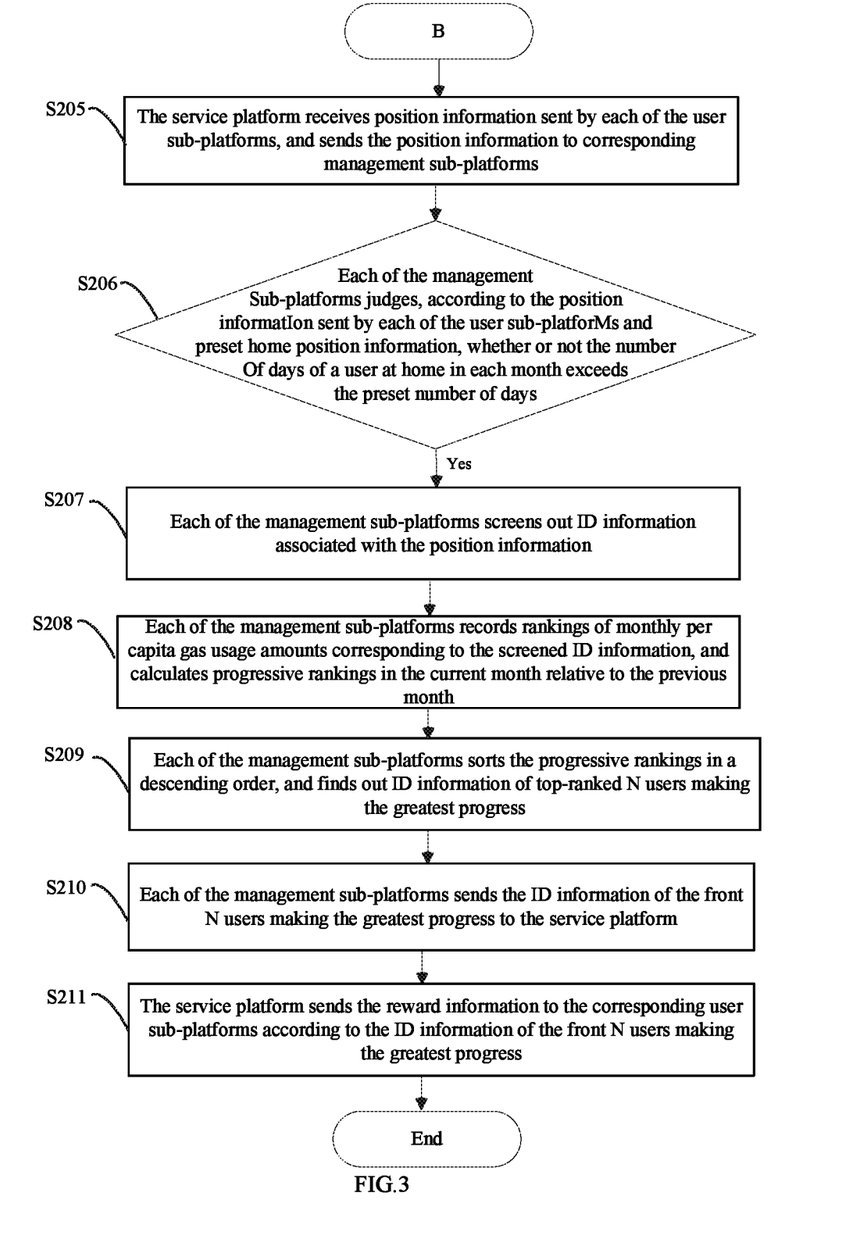

In addition, as shown in FIG. 3, in order to further accelerate the gas-saving consciousness of the users, after the step S203, the gas meter energy-saving motivating method based on the compound IoT further includes the following steps:

Step S205: the service platform 400 receives position information sent by each of the user sub-platforms 500, and sends the position information to corresponding management sub-platforms 300.

Each of the user platforms 500 includes a Global Positioning System (GPS) positioning module, so that the position information of each user may be positioned at any time.

Step S206: each of the management sub-platforms 300 judges, according to the position information sent by each of the user sub-platforms 500 and preset home position information, whether or not the number of days of a user at home in each month exceeds the preset number of days, and if yes, a step S207 is executed.

If there is a moment that position information sent by a user sub-platform 500 is overlapped with the preset home position information in a day, it is considered that the user is at home on the same day. In addition, in this embodiment, in order to ensure the fairness of the reward information in distribution, the preset number of days should be greater than 25 days if possible.

Step S207: each of the management sub-platforms 300 screens out ID information associated with the position information.

Step S208: each of the management sub-platforms 300 records rankings of monthly per capita gas usage amounts corresponding to the screened ID information, and calculates progressive rankings in the current month relative to the previous month.

Step S209: each of the management sub-platforms 300 sorts the progressive rankings in a descending order, and finds out ID information of top-ranked N users making the greatest progress.

Step S210: each of the management sub-platforms 300 sends the ID information of the front N users making the greatest progress to the service platform 400.

Step S211: the service platform 400 sends the reward information to the corresponding user sub-platforms 500 according to the ID information of the front N users making the greatest progress.

By sending rewards to the front N users who make the greatest progress in reducing the gas usage, the enthusiasm of the users to save the gas is further enhanced.

Figure 4:
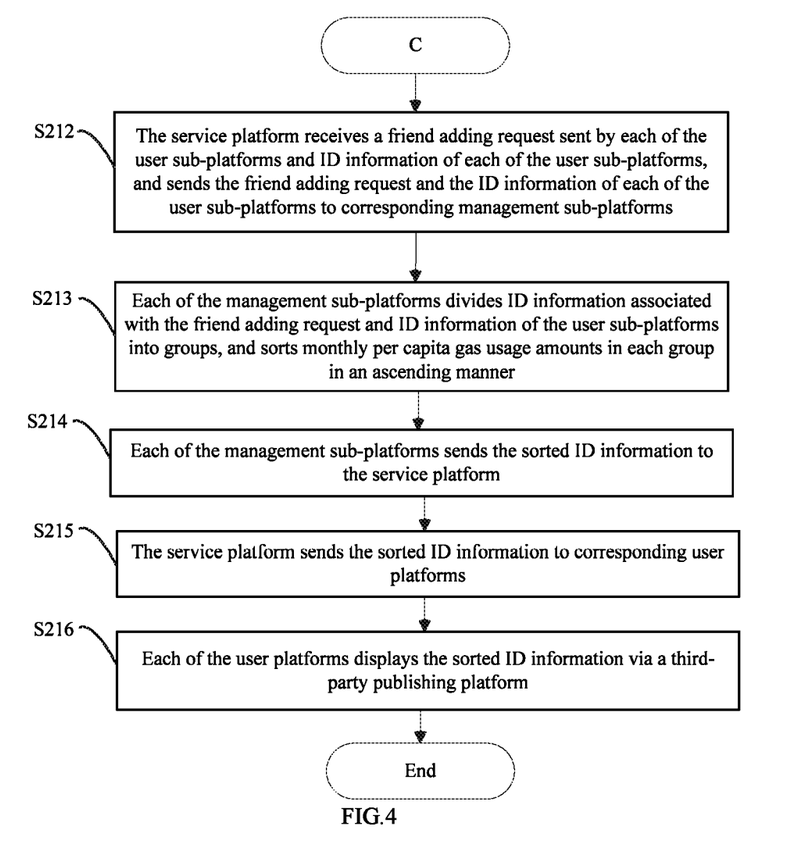

In addition, as shown in FIG. 4, in order to further accelerate the gas-saving consciousness of the users and the interestingness of the users in gas saving, the gas meter energy-saving motivating method based on the compound IoT further includes the following steps:

Step S212: the service platform 400 receives a friend adding request sent by each of the user sub-platforms 500 and ID information of each of the user sub-platforms 500, and sends the friend adding request and the ID information of each of the user sub-platforms 500 to corresponding management sub-platforms 300.

Step S213: each of the management sub-platforms 300 divides ID information associated with the friend adding request and ID information of the user sub-platforms 500 into groups, and sorts monthly per capita gas usage amounts in each group in an ascending manner.

For example, ID information of friends, family members, co-workers and classmates may be divided into one group to compete a lowest per capita gas usage amount among them.

Step S214: each of the management sub-platforms 300 sends the sorted ID information to the service platform 400.

Step S215: the service platform 400 sends the sorted ID information to corresponding user platforms.

Step S216: each of the user platforms displays the sorted ID information via a third-party publishing platform.

The third-party publishing platform is a WeChat platform or a QQ platform or an Alipay platform. The ID information may be associated with a WeChat nickname or a QQ nickname of each user. For example, the rankings of the per capita gas usage amounts are regularly sent to WeChat Moments or Qzone every month, so that the users can see the rankings of their own per capita gas usage amounts therein, thereby further prompting the users to save the gas as much as possible at the user platforms 500 and simultaneously further enhancing the interestingness of promoting the consciousness of energy saving and environmental protection.

Referring to FIG. 1, an embodiment of the present invention further provides a gas meter energy-saving motivating IoT system based on a compound IoT. It is to be noted that the basic principle and the generated technical effects of the gas meter energy-saving motivating IoT system based on the compound IoT provided by this embodiment of the present invention are the same as those of the foregoing embodiment. For a brief description, any portion not mentioned in this embodiment of the present invention may be referred to the corresponding content in the foregoing embodiment. The gas meter energy-saving motivating IoT system based on the compound IoT includes a plurality of user sub-platforms 500, a service platform 400, a plurality of management sub-platforms 300, a plurality of sensor network sub-platforms 200 and a plurality of object sub-platforms 100; and each of the object sub-platforms 100 includes a gas meter.

Each of the gas meters is configured to periodically send a monthly gas usage amount and ID information to a corresponding management sub-platform 300 via a corresponding sensor network sub-platform 200.

Each of the management sub-platforms 300 is configured to search for family population information associated with ID information, and calculate an average monthly gas usage amount according to monthly gas usage amounts and the family population information.

Each of the management sub-platforms 300 is configured to sort monthly per capita gas usage amounts in a preset area according to ID information in an ascending order, and send a sorting result to the service platform 400.

The service platform 400 is configured to send reward information to user sub-platforms 500 corresponding to top-ranked N monthly per capita gas usage amounts according to the sorting result.

Additionally, each of the management sub-platforms 300 is further configured to record a ranking of a monthly per capita gas usage amount corresponding to each piece of the received ID information, and calculate a progressive ranking in the current month relative to the previous month.

Each of the management sub-platforms 300 is further configured to sort progressive rankings in a descending order, and find out ID information of top-ranked N users making the greatest progress.

Each of the management sub-platforms 300 is further configured to send the ID information of the front N users making the greatest progress to the service platform 400.

The service platform 400 is further configured to send the reward information to the corresponding user sub-platforms 500 according to the ID information of the front N users making the greatest progress.

Preferably, the service platform 400 is further configured to receive position information sent by each of the user sub-platforms 500, and send the position information to corresponding management sub-platforms 300.

Each of the management sub-platforms 300 is further configured to judge, according to the position information sent by each of the user sub-platforms 500 and preset home position information, whether or not the number of days of a user at home in each month exceeds the preset number of days.

If the number of days of users at home in each month exceeds the preset number of days, each of the management sub-platforms 300 is further configured to screen out ID information associated with the position information.

Each of the management sub-platforms 300 is further configured to record rankings of monthly per capita gas usage amounts corresponding to the screened ID information, and calculate progressive rankings in the current month relative to the previous month.

Further, the service platform 400 is configured to receive a friend adding request sent by each of the user sub-platforms 500 and ID information of each of the user sub-platforms 500, and send the friend adding request and the ID information of each of the user sub-platforms 500 to corresponding management sub-platforms 300.

Each of the management sub-platforms 300 is further configured to divide ID information associated with the friend adding request and ID information of the user sub-platforms 500 into groups, and sort monthly per capita gas usage amounts in each group in an ascending manner.

Each of the management sub-platforms 300 is further configured to send the sorted ID information to the service platform 400.

The service platform 400 is further configured to send the sorted ID information to corresponding user platforms.

Each of the user platforms is further configured to display the sorted ID information via a third-party publishing platform.

The third-party publishing platform may be a WeChat platform or a QQ platform or an Alipay platform.

In conclusion, according to the gas meter energy-saving motivating method and IoT system based on the compound IoT provided by the present invention, each of the management sub-platforms searches for the family population information associated with the ID information, calculates the average monthly gas usage amount according to the monthly gas usage amounts and the family population information, sorts the monthly per capita gas usage amounts in the preset area according to the ID information in an ascending order, and sends the sorting result to the service platform; and then, the service platform sends the reward information to the user sub-platforms corresponding to the top-ranked N monthly per capita gas usage amounts according to the sorting result. Therefore, users who save the gas can be rewarded; and thus, the gas meter energy-saving motivating method and IoT system may accelerate the users to save the gas, enhance the gas-saving consciousness of the users, and are energy-saving and environment-friendly.

In several embodiments provided by the present application, it should be understood that the disclosed apparatus and method may also be implemented in other manners. The described apparatus embodiments are merely exemplary. For example, the flowcharts and block diagrams in the drawings illustrate the system architecture, function, and operation of possible implementations of apparatuses, methods, and computer program products according to various embodiments of the present invention. In this regard, each block in the flowcharts or block diagrams may represent a module, program segment, or portion of code, which includes one or more executable instructions for implementing the specified logical function(s). It should also be noted that in some alternative implementation manners, the functions noted in the block may occur out of the sequence noted in the drawings. For example, two continuous blocks, in fact, may be executed concurrently, or in a reverse order, which will depend upon the functions involved. It will also be noted that each block of the block diagrams and/or flowcharts, and combinations of blocks in the block diagrams and/or flowcharts, may be implemented by a special hardware-based IoT system that performs the specified functions or acts, or by using combinations of special hardware and computer instructions.

In addition, each module in the embodiments of the present invention may exist independently, and two or more modules may be integrated into an independent part.

When a function is implemented in the form of the software functional unit and sold or used as a separate product, the function may be stored in a computer readable storage medium. Based on such understanding, the technical solutions of the present invention or the part that makes contributions to the prior art or a part of the technical solutions may be substantially embodied in a form of a software product. The computer software product is stored in a storage medium, and includes several instructions to instruct a computer device (which may be a personal computer, server, network device, or the like) to execute all or some steps of the methods described in the embodiments of the present invention. The foregoing storage medium includes: various media capable of storing a program code, such as a disk, a mobile hard disk, a Read-Only Memory (ROM), a Random Access Memory (RAM), a magnetic disk or an optical disk. It should also be noted that, in the description, such relation terms as first and second are merely used for distinguishing one entity or operation from the other entity or operation, rather than requiring or hinting that these entities or operations have any practical relation or sequence. Moreover, the terms "comprise", "include" or any other variant are intended to cover non-exclusive inclusion, so that the processes, methods, articles or devices including a series of factors not only include those factors, but also include other factors listed implicitly, or further include inherent factors of the processes, methods, articles or devices. In the absence of more limitations, the factors defined by the statement "include one . . . " do not exclude other identical factors in the processes, methods, articles or devices including said factors.

The above are merely preferred embodiments of the present invention, and are not intended to limit the present invention. A person skilled in the art may make various modifications and changes to the present invention. Any modification, equivalent replacement, improvement and the like made within the spirit and principle of the present invention all shall be included in a scope of protection of the present invention. It should be noted that similar reference numerals and letters refer to similar items in the following drawings, and thus once an item is defined in one drawing, it does not need to be further defined and explained in the subsequent drawings.

The foregoing descriptions are merely specific implementation manners of the present invention, but are not intended to limit a scope of protection of the present invention. Any variation or replacement readily figured out by a person skilled in the art within the technical scope disclosed in the present invention shall fall within the scope of protection of the present invention. Therefore, the scope of protection of the present invention shall be subject to the scope of protection of the claims.

It should also be noted that, in the description, such relation terms as first and second are merely used for distinguishing one entity or operation from the other entity or operation, rather than requiring or hinting that these entities or operations have any practical relation or sequence. Moreover, the terms "comprise", "include" or any other variant are intended to cover non-exclusive inclusion, so that the processes, methods, articles or devices including a series of factors not only include those factors, but also include other factors listed implicitly, or further include inherent factors of the processes, methods, articles or devices. In the absence of more limitations, the factors defined by the statement "include one . . . " do not exclude other identical factors in the processes, methods, articles or devices including said factors.

What is claimed is:

1. A gas meter energy-saving motivating method based on a compound Internet of Things (IoT) comprising:

a plurality of user sub-platforms, a service platform, a plurality of management sub-platforms, a plurality of sensor network sub-platforms and a plurality of object sub-platforms; each of the object sub-platforms comprises a gas meter; and the gas meter energy-saving motivating method based on the compound IoT comprises:

periodically sending, by each of a plurality of gas meters, a monthly gas usage amount and Identification (ID) information to a corresponding management sub-platform via a corresponding sensor network sub-platform, wherein each of the gas meters is included in one of a plurality of object sub-platforms;

searching for, by each of a plurality of management sub-platforms, family population information associated with the ID information, and calculating an average monthly gas usage amount according to monthly gas usage amounts and the family population information;

sorting, by each of the management sub-platforms, monthly per capita gas usage amounts in a preset area according to the ID information in an ascending order, and sending a sorting result to a service platform; and sending, by the service platform, reward information to a plurality of user sub-platforms corresponding to one or more top-ranked monthly per capita gas usage amounts according to the sorting result.

2. The gas meter energy-saving motivating method based on the compound IoT according to claim 1, wherein the method further comprises:

recording, by each of the management sub-platforms, a ranking of a monthly per capita gas usage amount corresponding to each piece of the received the ID information, and calculating a progressive ranking in the current month relative to the previous month;

sorting, by each of the management sub-platforms, progressive rankings in a descending order, and finding out the ID information of one or more top-ranked users making the greatest progress;

sending, by each of the management sub-platforms, the ID information of one or more users that made the greatest progress to the service platform; and sending, by the service platform, the reward information to the corresponding user sub-platforms according to the ID information of the one or more users that made the greatest progress to the service platform.

3. The gas meter energy-saving motivating method based on the compound IoT according to claim 2, wherein before the step of recording, by each of the management sub-platforms, a ranking of a monthly per capita gas usage amount corresponding to each piece of the received the ID information, and calculating a progressive ranking in the current month relative to the previous month, the gas meter energy-saving motivating method based on the compound IoT further comprising:

receiving, by the service platform, position information sent by each of the user sub-platforms, and sending the position information to corresponding management sub-platforms;

judging, by each of the management sub-platforms, according to the position information sent by each of the user sub-platforms and preset home position information, whether the number of days of a user at home in each month exceeds the preset number of days or not;

if the number of days of users at home in each month exceeds the preset number of days, screening out, by each of the management sub-platforms, ID information associated with the position information; and wherein the step of recording, by each of the management sub-platforms, a ranking of a monthly per capita gas usage amount corresponding to each piece of the received ID information, and calculating a progressive ranking in the current month relative to the previous month comprises: recording, by each of the management sub-platforms, rankings of monthly per capita gas usage amounts corresponding to the screened ID information, and calculating progressive rankings in the current month relative to the previous month.

4. The gas meter energy-saving motivating method based on the compound IoT according to claim 1, wherein the gas meter energy-saving motivating method based on the compound IoT further comprises:

receiving, by the service platform, a friend adding request sent by each of the user sub-platforms and ID information of each of the user sub-platforms, and sending the friend adding request and the ID information of each of the user sub-platforms to corresponding management sub-platforms;

dividing, by each of the management sub-platforms, the ID information associated with the friend adding request and the ID information of the user sub-platforms into groups, and sorting monthly per capita gas usage amounts in each group in an ascending manner;

sending, by each of the management sub-platforms, the sorted ID information to the service platform;

sending, by the service platform, the sorted ID information to corresponding user platforms; and displaying, by each of the user platforms, the sorted ID information via a third-party publishing platform.

5. The gas meter energy-saving motivating method based on the compound IoT according to claim 4, wherein the third-party publishing platform is a WeChat platform or a QQ platform or an Alipay platform.

6. A gas meter energy-saving motivating Internet of Things (IoT) system based on a compound IoT comprising:

a plurality of user sub-platforms, a service platform, a plurality of management sub-platforms, a plurality of sensor network sub-platforms and a plurality of object sub-platforms; and each of the object sub-platforms comprises a gas meter;

wherein each of the gas meters is configured to periodically send a monthly gas usage amount and Identification (ID) information to a corresponding management sub-platform via a corresponding sensor network sub-platform;

wherein each of the management sub-platforms is configured to search for family population information associated with the ID information, and calculate an average monthly gas usage amount according to monthly gas usage amounts and the family population information;

wherein each of the management sub-platforms is configured to sort monthly per capita gas usage amounts in a preset area according to the ID information in an ascending order, and send a sorting result to the service platform; and wherein the service platform is configured to send reward information to user sub-platforms corresponding to one or more top-ranked monthly per capita gas usage amounts according to the sorting result.

7. The gas meter energy-saving motivating IoT system based on the compound IoT according to claim 6, wherein each of the management sub-platforms is further configured to record a ranking of a monthly per capita gas usage amount corresponding to each piece of the received ID information, and calculate a progressive ranking in the current month relative to the previous month;

each of the management sub-platforms is further configured to sort progressive rankings in a descending order, and find out the ID information of one or more top-ranked users that made the greatest progress;

each of the management sub-platforms is further configured to send the ID information of the one or more users that made the greatest progress to the service platform; and the service platform is further configured to send the reward information to the corresponding user sub-platforms according to the ID information of the one or more users that made the greatest progress.

8. The gas meter energy-saving motivating IoT system based on the compound IoT according to claim 7, wherein the service platform is configured to receive position information sent by each of the user sub-platforms, and send the position information to corresponding management sub-platforms;
- each of the management sub-platforms is further configured to judge, according to the position information sent by each of the user sub-platforms and preset home position information, whether or not the number of days of a user at home in each month exceeds the preset number of days;
- if the number of days of users at home in each month exceeds the preset number of days, each of the management sub-platforms is further configured to screen out ID information associated with the position information; and
- each of the management sub-platforms is further configured to record rankings of monthly per capita gas usage amounts corresponding to the screened ID information, and calculate progressive rankings in the current month relative to the previous month.

9. The gas meter energy-saving motivating IoT system based on the compound IoT according to claim 6, wherein the service platform is further configured to receive a friend adding request sent by each of the user sub-platforms and ID information of each of the user sub-platforms, and send the friend adding request and the ID information of each of the user sub-platforms to corresponding management sub-platforms;
- each of the management sub-platforms is further configured to divide ID information associated with the friend adding request and ID information of the user sub-platforms into groups, and sort monthly per capita gas usage amounts in each group in an ascending manner;
- each of the management sub-platforms is further configured to send the sorted ID information to the service platform;
- the service platform is further configured to send the sorted ID information to corresponding user platforms; and
- each of the user platforms is further configured to display the sorted ID information via a third-party publishing platform.

10. The gas meter energy-saving motivating IoT system based on the compound IoT according to claim 9, wherein the third-party publishing platform is a WeChat platform or a QQ platform or an Alipay platform.

* * * * *